Aug. 29, 1933.    H. R. ISLER    1,924,608
CUTTER GRINDER
Filed Nov. 19, 1931    3 Sheets-Sheet 1

Inventor
HERMAN R. ISLER
By A. K. Parsons
Attorney

Aug. 29, 1933.   H. R. ISLER   1,924,608
CUTTER GRINDER
Filed Nov. 19, 1931   3 Sheets-Sheet 2

Inventor
HERMAN R. ISLER
By HKParsons
Attorney

Aug. 29, 1933.   H. R. ISLER   1,924,608
CUTTER GRINDER
Filed Nov. 19, 1931    3 Sheets-Sheet 3

Inventor
HERMAN R. ISLER
H. H. Parsons  Attorney

Patented Aug. 29, 1933

1,924,608

UNITED STATES PATENT OFFICE 1,924,608

CUTTER GRINDER

Herman R. Isler, Norwood, Ohio, assignor to The Cincinnati Milling Machine Company, Cincinnati, Ohio, a corporation of Ohio Application November 19, 1931
Serial No. 576,117

14 Claims. (Cl. 51—95)

This invention relates to cutter grinders and more particularly to an improved transmission and control mechanism therefor.

One of the principal objects of this invention is to provide an improved transmission and control mechanism for a cutter grinder that will permit the table to reverse automatically under power in a smooth and easy manner thereby eliminating any abrupt movements that may mar the work piece.

Another object of this invention is to provide an improved transmission for the table of a cutter grinder in which the table may be moved by power, or manually through reduction gearing, or directly by pushing or pulling the table itself.

A further object of this invention is to provide an improved hydraulically actuated reversing mechanism for a cutter grinder and a lever for controlling the mechanism which is so constructed that it may be removed from the path of the table dogs to permit withdrawal of the work during internal grinding operations for sizing purposes; and also provided with clamping means for rigidly securing the lever in a fixed position to act as a positive stop in cutter grinding operations.

Other objects and advantages of the present invention will be readily apparent by reference to the following specification considered in conjunction with the accompanying drawings illustrative of one embodiment thereof, but it will be understood that any modifications may be made in the specific structural details within the scope of the appended claims without departing from or exceeding the spirit of the invention.

Referring to the drawings, in which like reference numerals indicate like or similar parts:

Figure 1:
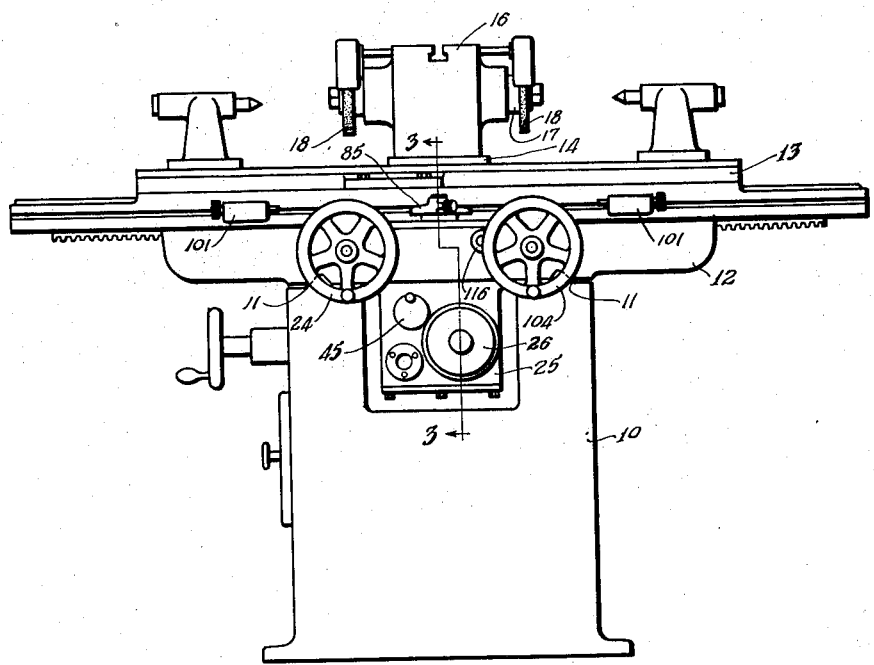
Figure 1 is a front elevation of a cutter grinder embodying the principles of this invention.
Figure 2:
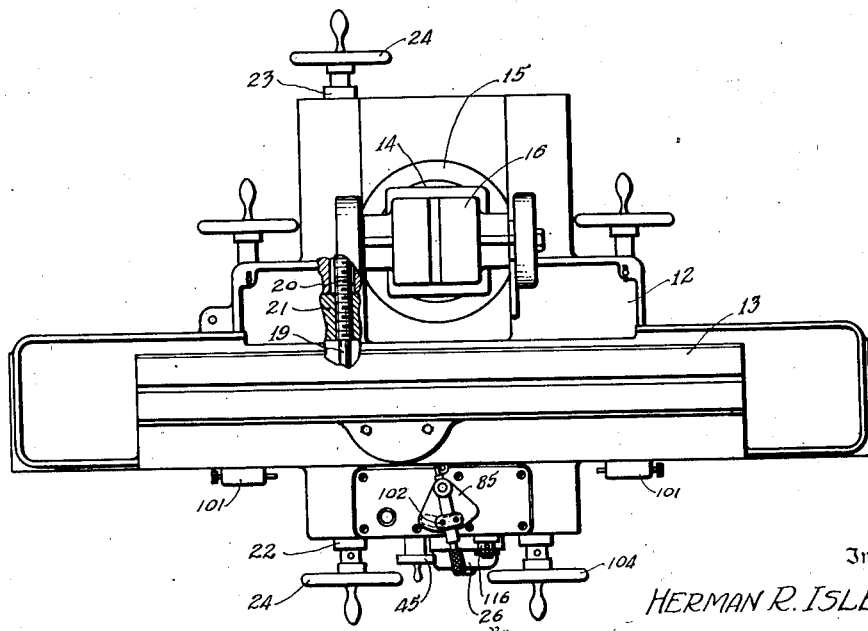
Figure 2 is a plan view of the machine shown in Figure 1.

In the drawings the reference numeral 10 indicates the bed of the machine which is of box-like construction, upon the top of which are formed spaced longitudinal guideways 11 for receiving a movable saddle 12. A table 13 is reciprocably mounted upon the saddle. A cylindrical sleeve 14 is adjustably mounted in a tubular guide 15 formed in the bed and has mounted upon the top thereof a cutter head 16. The cutter spindle 17 is journaled in the head and projects from opposite sides thereof for receiving a grinding wheel 18 on either end thereof. The tube 14 may be vertically adjusted up and down for varying the height of the grinding wheel with respect to the work and it may also be rotated to place the plane of the grinding wheel in a position parallel to the movement of the table, all in a well known manner which forms no part of the present invention. A prime mover, not shown, such as an electric motor may be located on the end of this tube inside of the machine for imparting rotation to the grinding wheel.

A horizontal shaft 19 journaled at opposite ends 22 and 23 in the saddle 12 is provided with a threaded portion 20 passing through a nut 21 fixed in the bed of the machine. A hand wheel 24 is attached to each end of the shaft whereby the saddle may be adjusted toward and from the grinding wheel from an operating position at the front of the machine or from an operating position at the rear of the machine. By this means the work may be fed into the grinding wheel as in cylindrical grinding operations or it may be moved laterally of the wheel as in surface grinding operations or cutter grinding operations.

A power transmission has been provided for reciprocating the table upon the saddle, and for the sake of convenience, this transmission is mounted in a transmission housing or casing 25 which depends from the under side of the saddle and is movable therewith whereby the connection between the power transmission and the table will not be disturbed during lateral adjustment of the saddle.

Figure 3:
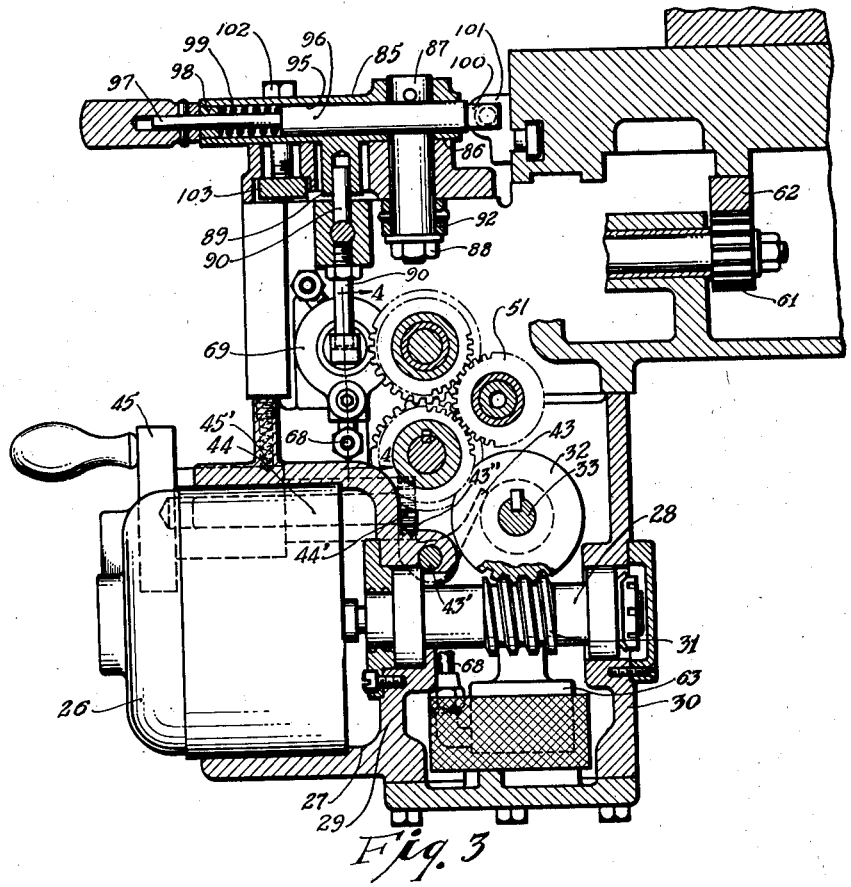
Figure 3 is a vertical section on the line 3—3 of Figure 1.
Figure 5:
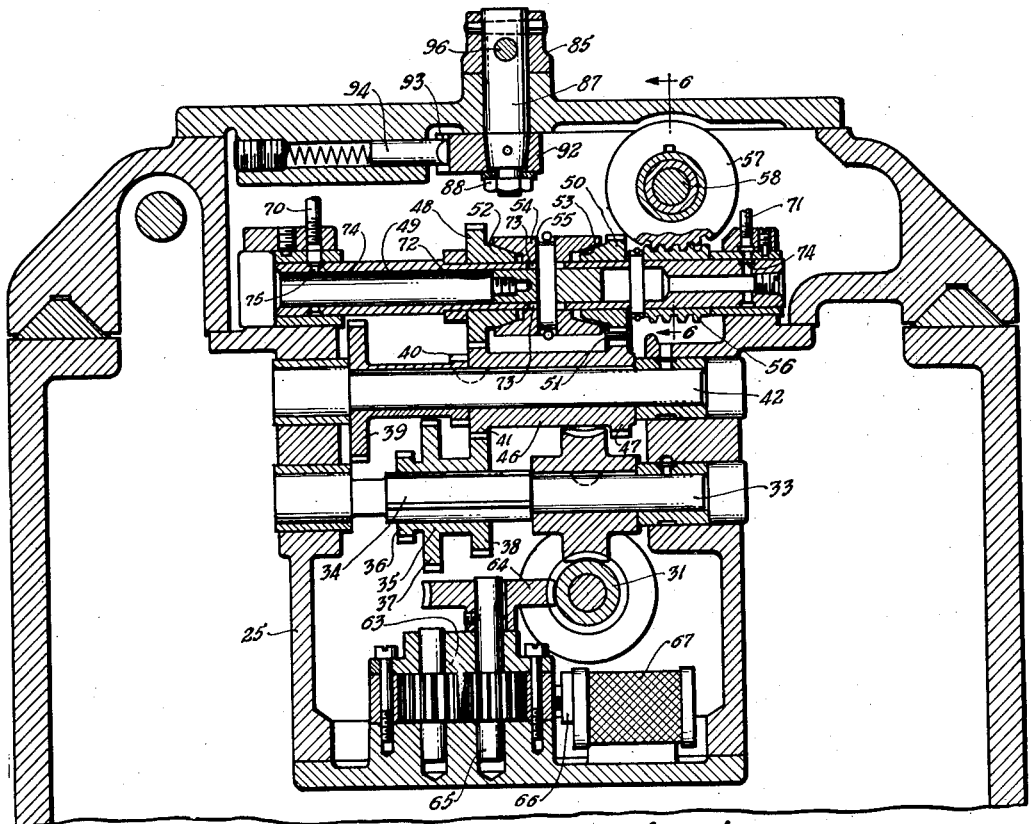
Figure 5 is an expanded view of the table transmission.

As shown more particularly in Figures 3 and 5, a prime mover such as an electric motor 26 is inserted in a pocket 27 formed in the side of the housing and connected to a worm shaft 28 which is anti-frictionally journaled in the opposite walls 29 and 30 of the casing. This shaft has an integral worm 31 meshing with a worm gear 32 keyed on the shaft 33 which extends laterally of the housing at right angles to the shaft 28. The shaft 33 has a splined portion 34 upon which is slidably mounted a gear cluster 35 comprising three gears 36, 37 and 38. These gears are respectively shiftable into mesh with gears 39, 40 and 41 keyed to the shaft 42 which extends parallel to the shaft 33 and is journaled at opposite ends in the walls of the housing. These gears constitute a variable feed transmission and are movable back and forth by means of a shifter fork 43 slidably mounted on a guide rod 43'. The boss of the fork is provided with rack teeth 43" meshing with pinion 44' secured to the end of a rotatable shaft 44 which projects through the wall of the housing and is provided on the exterior end thereof with an operating knob 45. A spring pressed detent 45' serves to hold the parts in adjusted position.

The gear 41 is formed on the end of a sleeve 46 which has a second gear 47 similar to the gear 41 formed on its opposite end. The gear 41 meshes directly with a gear 48 mounted for free rotation on the shaft 49, while the gear 47 meshes indirectly with the gear 50 mounted for free rotation on the shaft 49, through an idler gear 51. By means of this construction it will be seen that the gear 48 and the gear 50 rotate in opposite directions with respect to each other. Each of these gears is provided with a cone shaped hub 52 and 53 respectively which form friction clutch members engageable by the shiftable double cone clutch 54 constituting a reverser. This clutch has a pin 55 which passes through the hollow shaft 49 whereby upon rotation of the clutch member the shaft will be rotated.

Secured to the end of the shaft 49 is a worm 56 which meshes with a worm gear 57 mounted for free rotation on a shaft 58 extending at right angles to the shaft 49. The worm gear 57 has integrally connected therewith a clutch member 59 by means of which it may be connected to the shaft 58 through the shiftable clutch member 60, pinned to the shaft 58 and longitudinally movable therewith. The shaft 58 extends to the under side of the table and is provided with a pinion 61 which meshes with a rack 62 secured to the table. From the foregoing it will now be seen that a variable speed transmission has been provided for the table which terminates in a reversing clutch and a selector clutch, the reversing clutch being of the friction cone type which makes possible a smooth reverse.

The reversing clutch is shifted by hydraulic means, the pressure for which is provided by a pump 63 located in the bottom of the housing 25 and constantly rotated by the prime mover through a spiral gear 64, Figure 5, fixed to the end of the pump shaft 65 and meshing with the worm 31 which is constantly rotated by the prime mover. The pump is provided with an inlet 66 through which oil is drawn from the reservoir in the base of the housing through a strainer 67. A pipe 68, Figure 3, conducts the fluid pressure to the reversing valve 69, shown more particularly in Figure 4. The reversing valve has a pipe 70 and a pipe 71 threaded therein which extend to opposite ends of the hollow shaft 49, as shown in Figure 5.

This shaft is in the form of a cylinder and has reciprocably mounted therein a piston 72. The pin 55 which passes through the cone clutch member 54 also passes through the piston 72 to couple the clutch member with the piston for movement thereby. Elongated slots 73 are formed on opposite sides of the shaft 49 to permit longitudinal movement of the clutch without effecting axial movement of the shaft. Each end of the shaft 49 is provided with an annular groove 74 in which are formed a plurality of radial ports 75 which establish communication to the interior of the shaft, or in other words to opposite ends of the reversing cylinder. The pipe 70 is threaded in the bearing housing for the shaft in constant communication with the annular groove 74 irrespective of shaft rotation.

By mounting the pipes 70 and 71 in the bearings for the shaft 49 it will be seen that the pressure fluid which in the present instance is oil may be utilized for oiling the bearings of the shaft 49 as well as serving as an actuating medium for the shiftable clutch.

Figures 4, 7:
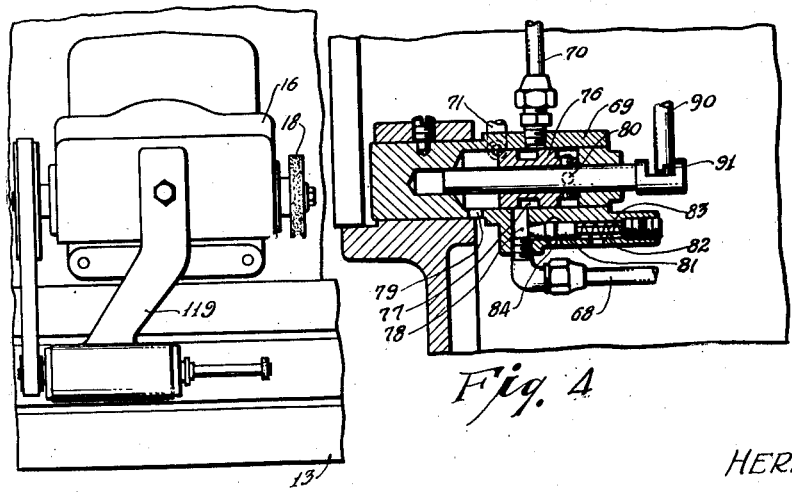
Figure 4 is a section on the line 4—4 of Figure 3.
Figure 7 is a plan view showing an internal grinding attachment applied to the tool head.

A piston type plunger 76 is reciprocably mounted in the reversing valve housing 69 and is provided with an annular groove 77 by which the fluid is conducted from the pressure port 78 to either port leading to the pipe 70 or 71 depending upon the longitudinal position of the plunger. If the plunger is moved to the right to the position as shown in Figure 4, the fluid will flow to the pipe 70 and the return fluid from pipe 71 will enter the left hand end of the valve and be discharged through outlet 79. Upon movement of the valve to the left the reverse connections will take place, pressure flowing to the pipe 71 and the return fluid from pipe 70 being discharged through outlet 80 formed in the side of the valve housing.

From the construction it will be noted that the pump is being rotated continuously by the prime mover and therefore offers a continuous flow of pressure to the reversing valve. Upon admittance of the fluid pressure to either end of the reversing clutch there will be no possibility of further flow after the clutch is shifted although the pump is still rotating. There has therefore been provided a relief valve plunger 81 which is reciprocably mounted in a bore 82 formed in the valve housing 69 and maintained in a closed position by means of a spring 83. The end of the plunger is tapered and normally closes the port 84, but as the pressure rises, the plunger is forced back and the fluid escapes through port 84 to the reservoir thereby maintaining a pressure in the system equal to the pressure or adjustment of the spring. The escaping oil flows over the transmission gearing on its way back to reservoir and thereby serves to lubricate the parts.

The reverser valve plunger 76 is adapted to be shifted by a control lever 85 which is pivotally mounted on a boss 86 formed in the saddle casting and about a pin 87 which passes through the boss and held in place by a nut 88 threaded on its lower end. The lever 85 has a depending lug 89 in the bore of which is fitted a pin 90 engaging a slot 91 formed in one side of the reversing valve stem. A lost motion connection is provided between the pin 90 and the slot 91 so that a load and fire mechanism, shown in Figure 5, may function to insure completion of any valve shifting movement. A detent member 92 is fastened to the end of the pin 87 between the nut 88 and the under side of the boss and is provided with two indents 93 which are selectively engageable by a spring pressed plunger 94.

The lever 85 is provided with a longitudinal bore 95 in which is reciprocably mounted a plunger 96. The plunger 96 which has a reduced portion 97 forming a shoulder between which and a fixed plug 98 is mounted a spring 99 for normally maintaining the plunger in an outward or projected position. The projecting end 100 of the plunger is adapted to be engaged by dogs 101 mounted in a T-slot formed in the side of the table for automatically shifting the same and controlling the direction of movement thereof.

When the machine is set up for internal grinding operations as shown in Figure 7 by the application of fixture 119 to the tool head, the usual range of reciprocating movement maintains the wheel always in contact with the work, and it therefore becomes necessary to move the table beyond the ordinary working range in order to size the same. By providing the reversing lever 85 with the reciprocably plunger 95 which may be withdrawn to permit the dog on the table to pass the plunger, it is possible to withdraw the work for sizing purposes without disturbing the dog setting. This makes it possible to conveniently use the machine for internal grinding operations without making any special changes thereto except the ordinary setting of the dogs.

When the machine is utilized for cutter grinder purposes in which case the table is usually reciprocated directly by manual pressure, it is many times desirable to have a fixed stop for limiting the amount of table movement in a given direction. To this end a pair of clamping bolts 102 are mounted in laterally projecting lugs on the lever 85 and these bolts extend into a T-slot formed in the top of the transmission housing. Square nuts 103 are mounted in the T-slots for receiving the bolts 102. By tightening these bolts, pivotal movement of the lever 85 is prevented and the projecting end 100 is thereby held rigid in a lateral direction and forms a positive stop which may be engaged by a suitably positioned dog on the table to limit its movement.

Figure 6:
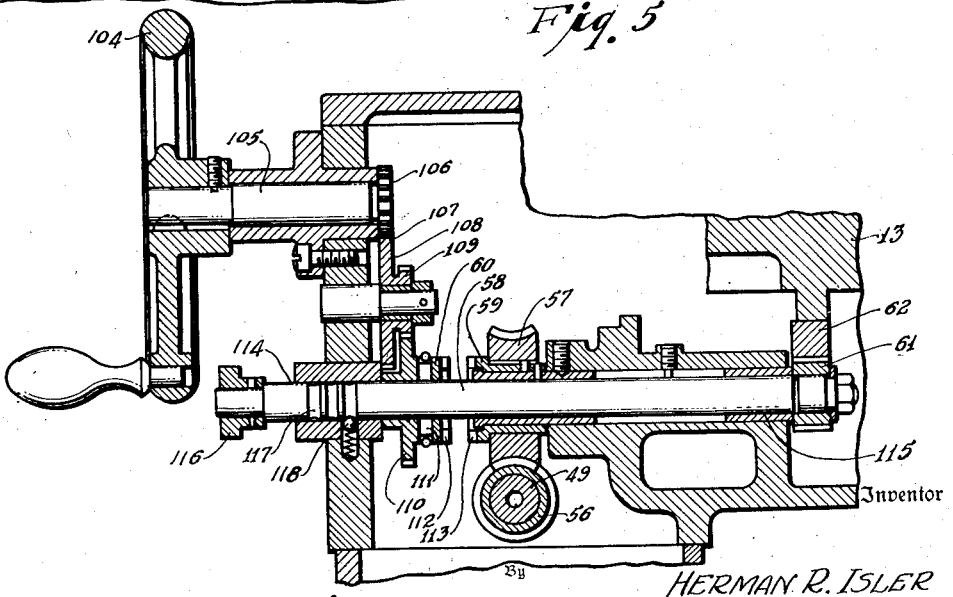
Figure 6 is a section on the line 6—6 of Figure 5.

As shown in Figure 6, manual means have been provided for reciprocating the table and comprise a hand wheel 104 which is mounted on the end of a rotatable shaft 105 journaled in the wall of the transmission housing and having secured to the inner end thereof the pinion 106. This pinion meshes with a spur gear 107 of a couplet 108, the other gear 109 of which meshes with spur gear 110. This latter gear is secured to the shaft 58 by a diametrical pin 111. The end face of the gear 110 is provided with clutch teeth 112 engageable with clutch teeth 113 formed on the end face of the hub 59 of the gear 57. The shaft 58 is longitudinally reciprocable in bearings 114 and 115 and a handle 116 is provided on the outer end for manually shifting the same.

This shaft has three axial positions, one of which, that shown in Figure 6, couples the hand wheel 104 with the shaft 58 to effect manual rotation of the pinion 61 to effect reciprocation of the table; a second or extreme right hand position in which the gear 110 moves out of mesh with the gear 109 and the clutch 112 meshes with the clutch 113 to effect power rotation of the pinion 61; and a third or neutral position in which the member 60 is out of engagement with both the gear 109 and the clutch teeth 113. In this position it will be seen that if the table is manually pushed or pulled there will be no gear train rotated thereby to impede this movement. The shaft 58 is provided with three peripheral grooves 117 which are engageable by a spring pressed ball 118 to maintain the shaft in any one of these three adjusted positions. The operator may thus select any one of three different ways for effecting reciprocation of the table in accordance with the type of work to be performed by the machine.

A cutter grinder has thus been provided with an improved transmission and control mechanism for effecting reciprocation of the work table, having a reversing clutch which is hydraulically shiftable and which is of such form that upon reversal the movement of the table will gradually be slowed down by friction means to zero velocity and then gradually increased in velocity in the opposite direction to effect smoothly a change in direction. Improved control means have been provided for determining the position of the clutch, and thereby the direction of movement of the table including a lever which is reciprocably mounted so that it may be removed from the path of table dogs to permit sizing of work in internal grinding operations; or may be clamped in a fixed position to act as a positive stop during certain cutter grinding operations.

That which is claimed is:

1. A cutter grinder having a bed, a saddle reciprocably mounted upon the bed, a grinding wheel, a table mounted on the saddle for reciprocation relative to the grinding wheel, power means for effecting said reciprocation including a transmission carried by the saddle, a friction reverser clutch mounted in the saddle for coupling the transmission to the table, and fluid operable means for shifting said clutch including an hydraulic operating circuit self-contained in one of the movable members.

2. A cutter grinder having a bed, a saddle reciprocably mounted on the bed, a grinding wheel, a table mounted on the saddle for reciprocation relative to the grinding wheel, power means carried by the saddle for effecting table reciprocation including a prime mover, a variable feed transmission actuated thereby, said transmission terminating in a reverser consisting of a double cone clutch, hydraulically actuated means for shifting said clutch and a pump mounted in the saddle for continuous actuation by the prime mover for supplying fluid pressure to said means.

3. A cutter grinder having a bed, a saddle, a table reciprocably mounted on the saddle, power means carried by the saddle for effecting reciprocation of the table including a prime mover, a variable feed transmission actuated thereby, an intermediate shaft, a pair of members mounted on the shaft for free rotation and driven in opposite directions by said transmission, said members having opposed clutch faces, a shiftable clutch interposed therebetween for engaging said faces to determine the direction of rotation of said shaft, hydraulic means for shifting said clutch and a selector clutch for coupling the shiftable clutch member to the table for imparting movement thereto.

4. A cutter grinder having a wheel head, a saddle movable toward and from the wheel head, a table reciprocably mounted on the saddle, power means carried by the saddle for effecting reciprocation of the table including a prime mover, a variable feed transmission actuated thereby, a reverser clutch, hydraulic means for shifting said clutch, a final drive shaft, a selector clutch for coupling the reverser to said shaft, manually actuable means for rotating said shaft, means to shift the selector clutch to couple the manual means to the final shaft, said selector clutch having an intermediate position which thereby disconnects both of said means from the final shaft to permit movement of the table directly by manual pressure.

5. A cutter grinder having a wheel head, a saddle movable toward and from the wheel head, a table reciprocably mounted on the saddle, power means carried by the saddle for effecting reciprocation of the table including a prime mover, a variable feed transmission actuated thereby, said transmission terminating in a reverser clutch, motion transmitting means coupling the clutch and the table, hydraulic means for shifting said clutch including a control valve, a pump mounted in the saddle and continuously actuated by the prime mover, a pressure line extending from the pump to the valve, branch lines extending from the valve to opposite ends of the reverser clutch, and control means for shifting said valve to alternatively couple the pressure to the different branch lines to thereby determine the direction of movement of the table.

6. A cutter grinder having a grinding wheel, a saddle reciprocably mounted for movement toward and from the grinding wheel, a table reciprocably mounted upon the saddle, a transmission housing depending from the under side of the saddle, said housing containing a variable feed transmission, a prime mover coupled therewith, a rotatable shaft journaled in the front wall of said housing, a shifter fork actuated thereby for effecting speed changes in the transmission, said transmission terminating in a double cone reversing clutch, means to shift said clutch including a cylinder, an elongated piston slidably mounted in the cylinder, a shifter rod extending radially from the piston in engagement with said clutch, a reverser valve, a pump continuously actuated by the prime mover, a pressure channel extending from the pump to the valve, parallel lines extending from the valve to opposite ends of the cylinder, means to move the valve to couple the pressure with one of these lines and thereby determine the direction of movement of the table, and means to relieve the pressure in said lines after the shifting movement including a relief valve and means to adjust the valve to determine the pressure in said lines.

7. A cutter grinder having a tool head, a saddle reciprocably mounted for movement toward and from the tool head, a table mounted on the saddle, a transmission housing depending from the under side of the saddle, said housing containing a prime mover, a variable feed transmission, and a reverser clutch in the order recited, hydraulic means for shifting said clutch including a pump continuously actuated by the prime mover, a reversing valve, a pressure line extending from the pump to the reversing valve, branch lines extending from the valve to opposite ends of the clutch to effect actuation thereof, said valve having a control lever rotatably mounted adjacent the edge of the table; lost motion means connecting the lever with the reversing valve, detent mechanism associated with the lever and dogs carried by the table for rotating said lever and shifting said valve to automatically change the direction of movement of the table.

8. A cutter grinder having a support, a table reciprocably mounted upon the support, means to effect reciprocation of the table including a prime mover, a mechanical transmission, and a reversing clutch in the order recited, a selector clutch for coupling the reverser clutch with the table, hydraulic means for shifting the reverser clutch including a control valve, a control lever pivotally mounted adjacent the edge of the work table, lost motion means coupling the lever with the control valve, dogs carried by the table and adapted to be positioned upon opposite sides of the control lever to determine the work cycle of the machine and means to withdraw the control lever from the path of said dogs to permit movement of the table beyond the cyclic range to permit access to the work without interference from the tool head.

9. A cutter grinder having a support, a table reciprocably mounted upon the support, power transmission for effecting said reciprocation, a control lever pivotally mounted adjacent the table for determining the direction of actuation of the table by said transmission, a selector clutch for coupling the transmission to the table to effect power actuation thereof, means to move the selector clutch to a neutral position to disconnect the transmission from the table, means to clamp the control lever in a fixed position to form a fixed abutment, and dogs positionable upon the table for engaging said abutment to limit manual movement of the table in a desired direction.

10. A cutter grinder having a grinding wheel, a support, a table reciprocably mounted on said support, power actuated means for effecting reciprocation of the table relative to the wheel including a reciprocable direction determinator, a control lever pivotally mounted on the support, lost motion means coupling the lever to said determinator for shifting the latter to a table forward or a table return position, detent means for maintaining the lever in either position, trip dogs carried by the table, a plunger mounted in the lever and projecting into the path of said dogs for alternate engagement thereby to effect shifting of said determinator and thereby automatic reversal in the direction of table movement.

11. A cutter grinder having a grinding wheel, a support, a table reciprocably mounted on said support, power actuated means for effecting reciprocation of the table relative to the wheel including a reciprocable direction determinator, a control lever pivotally mounted on the support, lost motion means coupling the lever to said determinator for shifting the latter to a table forward or a table return position, detent means for maintaining the lever in either position, trip dogs carried by the table, a plunger mounted in the lever and projecting into the path of said dogs for alternate engagement thereby to effect shifting of said determinator and thereby automatic reversal in the direction of table movement, resilient means for normally maintaining the plunger in the path of said dogs, means to withdraw the plunger from the path of said dogs whereby the table will move to an extreme outward position, said withdrawal means also being operable to effect shifting of said determinator to effect reversal of the table at other points in its travel than those determined by the trip dogs.

12. A cutter grinder having a grinding wheel, a support, a table reciprocably mounted on said support, power actuated means for effecting reciprocation of the table relative to the wheel including a reciprocable direction determinator, a control lever pivotally mounted on the support, lost motion means coupling the lever to said determinator for shifting the latter to a table forward or a table return position, detent means for maintaining the lever in either position, trip dogs carried by the table, a plunger mounted in the lever and projecting into the path of said dogs for alternate engagement thereby to effect shifting of said determinator and thereby automatic reversal in the direction of table movement, resilient means for normally maintaining the plunger in the path of said dogs, means to withdraw the plunger to permit movement of the table to an extreme position beyond that determined by said dogs, and additional means for disconnecting the power operated means from the table to stop the same when in said extreme position.

13. A cutter grinder having a grinding wheel, a support, a table reciprocably mounted on said support, power operable means for effecting reciprocation of the table relative to the wheel including a reciprocable direction determinator, a control lever pivotally mounted on the support, means to disconnect the power operable means from the table whereby the same may be directly manually reciprocated, means to clamp the lever in a fixed position, trip dogs carried by the table for cooperation with said fixed lever to limit the table movement in each direction during manual actuation thereof, said clamping means including an arcuate T-slot formed in the support, T-bolts carried by the lever and depending in said slot, and means carried by the bolts and confined in said slot whereby upon rotation of the bolts the lever will be clamped to the support.

14. A cutter grinder comprising a bed, a grinding wheel supported by the bed, a saddle reciprocably mounted on the bed for adjustment toward and from the wheel, a work table reciprocably mounted on the saddle, a closed housing containing a variable speed transmission depending from the under-side of said saddle, a prime mover carried by the housing, means detachably connecting the transmission to the table, said transmission including a fluid shiftable reversing clutch, a source of pressure self-contained in the housing including a pump continuously operated by the prime mover, a reversing valve mounted in the upper part of the housing for trip operation by the table, a supply channel coupling the pump to the valve, fluid connections extending from the valve to the fluid shiftable means, a relief valve in said channel for maintaining a constant pressure therein, and means to conduct the exhaust fluid from the valve to lubricate said transmission gearing.

HERMAN R. ISLER.